Jan. 16, 1940.  L. S. COOPER  2,186,959
HOT GASSING PROCESS
Filed Dec. 12, 1936
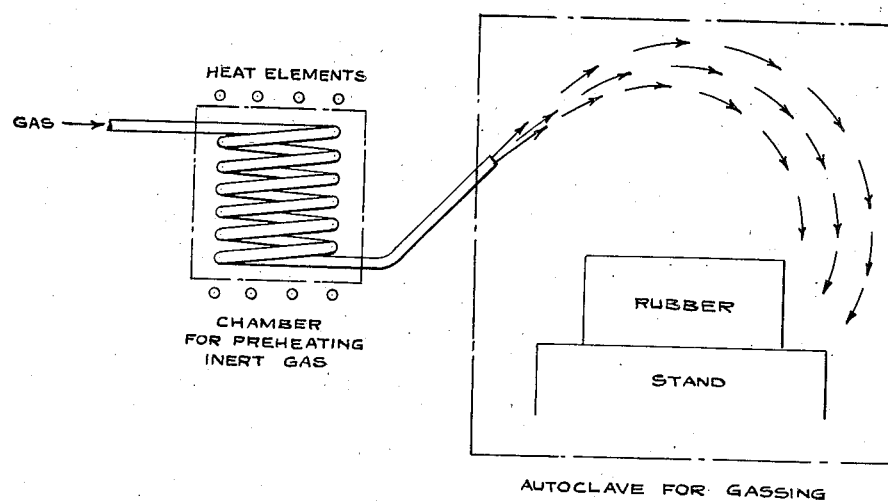
INVENTOR.
Lester S. Cooper
BY
ATTORNEY.

Patented Jan. 16, 1940

2,186,959

UNITED STATES PATENT OFFICE 2,186,959

HOT GASSING PROCESS

Lester S. Cooper, Port Clinton, Ohio, assignor to Rubatex Products, Inc., New York, N. Y., a corporation of Delaware Application December 12, 1936, Serial No. 115,583

6 Claims. (Cl. 18—53)

This invention relates to novel methods of manufacturing gas expanded rubber and more particularly relates to novel methods of heating the rubber dough during the gas impregnation stage.

Gas expanded rubber is manufactured by subjecting a charge of rubber dough to an inert gas such as nitrogen under a relatively high pressure and effecting a cure or semi-cure of the rubber during this stage. This invention has particular application to gas expanded rubber of an individual cellular structure such as is disclosed in the U. S. Patent No. 1,905,269 to Denton.

The cellular rubber structure is produced by curing or semi-curing the gassed rubber mass so as to impart enough strength to the cell walls to retain the adsorbed gas after the pressure is released. Prior processes, accordingly, carried on the gassing cycle in a high pressure chamber or autoclave lined with steam coils for heating thereof. The heat necessarily passed through the gas space between the walls and the rubber by convexion or gaseous conduction. The rubber was heated from the surface inwardly and much difficulty was encountered by non-uniform or non-homogeneous heating due to the irregular transfer of heat from the chamber walls to the interior of the rubber bulk. The gassing and semi-curing process necessarily took a relatively long time for completion in order to gas the core of the rubber dough.

However, the curing of rubber compounds is a progressive physical and chemical change accelerated by organic compounds and sulphur, which process is further accelerated by heat. Rubber is a good heat insulating material and, when it is expanded and contains nitrogen cells due to gassing, its heat insulating properties are considerably increased. Accordingly, as the gassing cycle progresses, it becomes increasingly difficult to drive sufficient heat through to the center of the dough to effect a homogeneous cure or semi-cure thereof. The outer portion of the rubber mass being gassed and heated will be exposed and receive heat first and become hotter for a longer period of time than the inner portions of the dough. The heating differential through the cross-section of the rubber mass is in direct proportion to the heat conductivity of the mass. Accordingly, non-uniform heating results in a non-homogeneous rubber product.

In accordance with the present invention, the gas introduced at high pressure in the autoclave is heated before introduction to the autoclave. The penetration of the pre-heated gas into the rubber dough results in a direct and uniform heating thereof. In a preferred procedure for carrying out this invention, the preheated gas is circulated through the autoclave so as to constantly maintain a predetermined temperature during the gassing cycle. In prior processes the gas under pressure was relatively stationary and accordingly not at a uniform temperature and never was preheated.

The cooling of the gassed dough in the autoclaves was carried out in prior processes by circulating cold water through the steam coils of the autoclave. A more rapid and efficient method of cooling gassed dough is to circulate gas at the cold temperature through the autoclave in a manner similar to the circulation of the hot gas herein disclosed.

It is accordingly an object of the present invention to provide a novel method of gassing rubber in the manufacture of gas expanded rubber products.

Another object of the present invention is to provide a novel process for gassing and heating rubber dough in a rapid, efficient and homogeneous manner.

A further object of the present invention is to provide a novel process for heating materials under gaseous pressure.

It is still a further object of the present invention to provide a novel method of cooling a heated gassed charge in a high pressure vessel.

These and further objects will become evident in the following description of the invention applied to the manufacture of gas expanded rubber.

In carrying out the present invention, the rubber dough is prepared in accordance with well known practice already established in the art and described in the Denton patent supra and also in the application Ser. No. 717,550 filed April 26, 1934, and assigned to Rubatex Products, Inc., assignees of the present invention. The rubber dough is in a plastic state and is introduced to the high pressure gassing chamber or autoclave which is previously evacuated of air and sealed. Nitrogen is preferably used as the gas to be forced into the rubber, although a different gas may be employed. Nitrogen is pre-heated before being introduced to the autoclave. The pre-heating of the gas may be accomplished by either heating a tank containing the nitrogen at the high pressure required or by passing the nitrogen through a heated coil system while being conducted from the storage or compression stage to the autoclave. The particular method of heating the gas before introduction into the autoclave is immaterial to the present invention.

The pre-heated gas is then introduced at a suitable high pressure of the order of 3000 pounds per square inch and immediate penetration through the plastic rubber dough occurs. It has been found that a temperature of the order of 207° F. is a suitable temperature for maintaining the nitrogen in this process. The heated nitrogen is circulated through the autoclave in order to more readily maintain a predetermined temperature condition of the process. Automatic temperature control of the circulating hot gas cycle is advisable.

The drawing illustrates diagrammatically the above described process.

The advantage of the present invention will be evident whether the charge of rubber dough is pre-heated or pre-cured before being placed in the autoclave or whether it is charged cold. The autoclave may be cold before the introduction of the pre-heated nitrogen, but a heated autoclave is preferable in order to more quickly stabilize the operating conditions. The advantages of this process specifically in the penetration of the hot gas into the interior of the rubber in a rapid and efficient manner to effect a uniform and homogeneous curing or semi-curing of the dough according to the temperatures and time intervals employed. The same process may be used to heat other industrial materials or to polymerize them. This process is also applicable to the manufacture of sponge rubber where the cells intercommunicate.

After the gassing and semi-curing of the rubber has been carried on for a sufficient period, the process is completed by removal of the gassed dough from the autoclave. It is the practice to cool down the gassed dough before removal so as to permit ready handling of the dough and to avoid internal rupturing of the cells due to the hot gases contained therein being exposed to atmospheric conditions. Cooling of the autoclave reduces the internal pressures and strains of the individual gas cells. The cooling stage may be effectively carried out by the present invention by circulating cold gas for the cooling. Nitrogen, preferably at the same high pressure as the hot gas, although a reduced pressure is possible in most instances, is introduced to the autoclave to cool its contents and complete the gassing cycle. The cold gas, for example nitrogen at 60° F., is circulated through the autoclave preferably with a gas circulating system separate from that of the hot gas circulating system. Cold gassing avoids the necessity of cooling liquid circulating through the autoclave walls or coils and accomplishes the same result in a more rapid manner.

What is claimed is:

1. In the method of forming gas expanded rubber the step of impregnating rubber dough with gas which comprises disposing the rubber dough in a chamber, pre-heating an inert gas to a semi-curing temperature outside the chamber, and then subjecting the rubber dough disposed in a chamber to the pre-heated gas at a high pressure.

2. The method of gassing rubber dough in a chamber which comprises disposing the rubber dough in a chamber, pre-heating an inert gas to a semi-curing temperature outside the chamber, subjecting the rubber dough to the pre-heated gas at the semi-curing temperature and circulating the gas through the chamber whereby the gas penetrates and gas impregnates rubber dough and simultaneously substantially uniformly semi-cures the dough to form a self-sustaining gassed rubber structure.

3. The method of impregnating rubber dough with gas in a chamber which comprises placing the rubber dough in a chamber, heating nitrogen outside the chamber to a vulcanizing temperature, conducting said heated nitrogen into said chamber subjecting the rubber dough to the heated nitrogen at a pressure of the order of 3000 pounds per square inch, circulating the nitrogen through the chamber to maintain the temperature of the nitrogen substantially constant whereby the nitrogen penetrates and gas impregnates the dough and simultaneously substantially uniformly vulcanizes the dough to form a self-sustaining gassed rubber structure.

4. The method of impregnating rubber dough with gas in a chamber which comprises placing the rubber dough in a chamber, pre-heating an inert gas outside the chamber to a semi-curing temperature, subjecting the rubber dough to the pre-heated gas under pressure to penetrate the rubber therewith and circulating the gas through the chamber whereby the gas penetrates and gas impregnates the rubber dough and simultaneously substantially uniformly semi-cures the dough to form a self-sustaining gassed cellular structure and subsequently circulating cold gas to the chamber at the high pressure to cool the gassed dough.

5. The method of gassing rubber dough in a chamber which comprises pre-heating the rubber dough and pre-heating the chamber, sealing the dough in the chamber, heating nitrogen outside the chamber to a temperature of the order of 207°, admitting the nitrogen to the chamber at a pressure of the order of 3000 pounds per square inch, circulating the nitrogen through the chamber and maintaining the temperature of the nitrogen substantially constant whereby the nitrogen penetrates and gas impregnates the dough and simultaneously substantially uniformly semi-cures the dough to form a self-sustaining gassed rubber structure, and subsequently circulating nitrogen of the order of 60° F. to the chamber at the high pressure to cool the gassed rubber dough.

6. A method for gassing rubber which comprises disposing rubber within a chamber; heating an inert gas outside the chamber to a partially vulcanizing temperature; introducing said heated inert gas into said chamber; subjecting the rubber to said heated inert gas to gas impregnate the rubber and partially vulcanize it homogeneously throughout its mass.

LESTER S. COOPER.